(12) United States Patent
Baldemair et al.

(10) Patent No.: US 10,772,106 B2
(45) Date of Patent: Sep. 8, 2020

(54) RADIO NETWORK NODE, WIRELESS DEVICE AND METHODS PERFORMED THEREIN

(71) Applicant: Telefonaktiebolaget LM Ericsson (publ), Stockholm (SE)

(72) Inventors: Robert Baldemair, Solna (SE); Martin Hessler, Linköping (SE); Eleftherios Karipidis, Stockholm (SE); Bo Lincoln, Lund (SE); Torgny Palenius, Barsebäck (SE); Eliane Semaan, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 15/524,131

(22) PCT Filed: Mar. 8, 2017

(86) PCT No.: PCT/SE2017/050211
§ 371 (c)(1),
(2) Date: May 3, 2017

(87) PCT Pub. No.: WO2018/164613
PCT Pub. Date: Sep. 13, 2018

(65) Prior Publication Data
US 2018/0302906 A1 Oct. 18, 2018

(51) Int. Cl.
*H04L 12/24* (2006.01)
*H04W 84/18* (2009.01)
(Continued)

(52) U.S. Cl.
CPC ........... *H04W 72/10* (2013.01); *H04L 1/0015* (2013.01); *H04W 72/085* (2013.01)

(58) Field of Classification Search
CPC ... H04W 72/10; H04W 72/085; H04W 72/12; H04L 1/0023; H04L 1/0015
See application file for complete search history.

(56) References Cited

U.S. PATENT DOCUMENTS

| 2006/0115012 A1* | 6/2006 | Sadowsky | H04L 27/2607 375/260 |
| 2007/0155387 A1* | 7/2007 | Li | H04L 27/2602 455/441 |

(Continued)

FOREIGN PATENT DOCUMENTS

| EP | 1416661 | * 10/2003 | .............. H04L 1/00 |
| EP | 1416661 A2 | 5/2004 | |

(Continued)

OTHER PUBLICATIONS

Unknown, Author, "Design Target and Initial Evaluation Results on Waveform for NR", 3GPP TSG RAN WG1 Meeting ™85, R1-165584, Nanjing, China, May 23-27, 2016, pp. 1-10.

(Continued)

*Primary Examiner* — Faruk Hamza
*Assistant Examiner* — Abusayeed M Haque
(74) *Attorney, Agent, or Firm* — Sage Patent Group

(57) ABSTRACT

Embodiments herein relate to a method performed by a wireless device for managing communication of the wireless device in a wireless communications network. The wireless device determines at least two waveform parameters based on a metric of the wireless device, for communicating data between the wireless device and a radio network node in the wireless communications network. The wireless device further transmits an indication indicating the at least two determined waveform parameters to the radio network node.

21 Claims, 6 Drawing Sheets

(51) Int. Cl.
*H04M 15/00* (2006.01)
*H04L 29/06* (2006.01)
*H04L 12/28* (2006.01)
*H04W 72/10* (2009.01)
*H04L 1/00* (2006.01)
*H04W 72/08* (2009.01)

(56) References Cited

U.S. PATENT DOCUMENTS

| | | | |
|---|---|---|---|
| 2009/0209264 A1 | 8/2009 | Yang et al. | |
| 2010/0149961 A1* | 6/2010 | Lee | H04L 27/2602 370/204 |
| 2015/0146654 A1* | 5/2015 | Chu | H04W 72/1289 370/329 |
| 2015/0189526 A1* | 7/2015 | Yang | H04W 72/085 370/252 |
| 2017/0093607 A1* | 3/2017 | Kumar | H04L 27/2671 |
| 2017/0257238 A1* | 9/2017 | Qian | H04L 27/2628 |
| 2018/0183532 A1* | 6/2018 | Da Silva | H04B 17/336 |
| 2020/0028726 A1* | 1/2020 | Karlsson | H04L 27/2646 |

FOREIGN PATENT DOCUMENTS

| | | | | |
|---|---|---|---|---|
| EP | 1566917 A2 | 8/2005 | | |
| WO | 2014171877 A1 | 10/2014 | | |
| WO | WO 2014171877 | * 10/2014 | | H04B 7/04 |
| WO | 2014171877 A8 | 2/2015 | | |
| WO | 2016082101 A1 | 6/2016 | | |
| WO | 2016089755 A1 | 6/2016 | | |

OTHER PUBLICATIONS

Unknown, Author, "Numerology Requirements", 3GPP TSG RAN WG1 Meeting#84bis, R1-163397, version of R1-162204, Busan, Korea, Apr. 11-15, 2016, pp. 1-8.

* cited by examiner

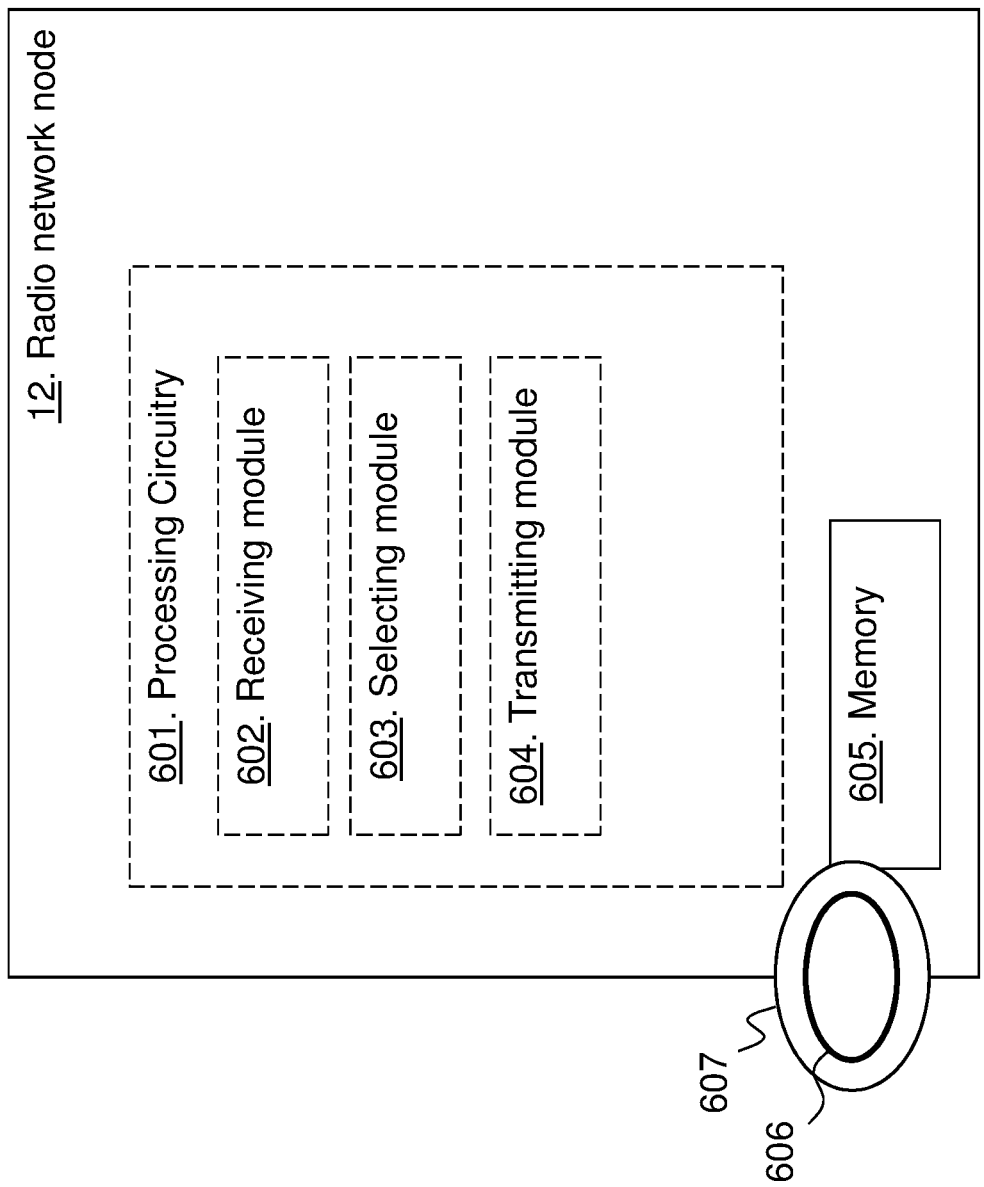

RADIO NETWORK NODE, WIRELESS DEVICE AND METHODS PERFORMED THEREIN

TECHNICAL FIELD

Embodiments herein relate to a radio network node, a wireless device and methods performed therein. Furthermore, a computer program and a computer readable storage medium are also provided herein. In particular, embodiments herein relate to managing communication of the wireless device in a wireless communications network.

BACKGROUND

In a typical wireless communications network, wireless devices, also known as wireless communication devices, mobile stations, stations (STA) and/or user equipments (UE), communicate via a Radio Access Network (RAN) to one or more core networks (CN). The RAN covers a geographical area and provide radio coverage over service areas or cell areas, which may also be referred to as a beam or a beam group, with each service area or beam being served or controlled by a radio network node such as a radio access node e.g., a Wi-Fi access point or a radio base station (RBS), which in some networks may also be denoted, for example, a "NodeB" or "eNodeB" or "gNodeB". The radio network node communicates over an air interface operating on radio frequencies with the wireless device within range of the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

The continuously evolving wireless communications networks are expected to cover many different use cases and will be operating in many different frequency spectra. With a wide array of applications, frequency bands, i.e. sub-1 GHz to 100 GHz, bandwidths and different modes of operations, e.g. licensed vs. unlicensed, different radio requirements have to be fulfilled. These radio requirements are subject to the regulatory requirements in the specific geographical region, to the specific frequency band/sub-band, etc. . . .

Moreover, the regulatory constraints, radio frequency planning and device capability demand appropriate selection, and adaptation of circuitry of wireless devices, which is in its turn highly important in order to optimize performance of the wireless device as well as its power consumption.

The evolving fifth generation (5G) wireless communications networks are envisioned to overcome the limitations of existing cellular networks by allowing for higher data rates, improved user experience, lower energy consumption and satisfying the ever-increasing traffic demand. For this purpose, the need for additional spectrum beyond what was previously allocated to existing standards is emerging. The use of high frequency bands, including licensed, unlicensed and licensed-shared spectrum is a potential candidate to overcome the problem of scarce spectrum resources by allowing for wider bandwidths, more advanced antenna arrays and massive beam-forming.

In order for the evolving wireless communications networks to handle the envisioned growth in traffic volume, wider frequency bands, new spectrum, advanced antenna solutions and in some cases denser deployments are needed. In addition, a massive growth in the number of connected wireless devices as well as an increasingly wide range of new applications are expected in order to enable a well-functioning networked society, where information can be accessed and data shared anywhere and anytime, by anyone and anything.

Similarly, other evolving technologies, including the fourth generation (4G) wireless communications networks and Wi-Fi are challenged by the same demands.

Multi-antenna technologies have a key role in the design of modern Radio Access Technologies (RAT) due to their well-recognized benefits. Specifically, the multi-antenna technologies enable array gain, spatial multiplexing, and spatial diversity, which lead to improved coverage, capacity, and robustness. The multi-antenna features have significantly contributed to the success of LTE and continue driving its evolution. Multi-antenna technologies have an even larger relevance in high frequency bands. For instance, high frequency propagation is subject to several loss factors, starting from the high atmospheric attenuation, rain fade, foliage attenuation, building and wall penetration, diffraction and body/obstruction loss. While some of the mentioned loss aspects may be considered as minor problems for lower frequency bands, their impact becomes severe in millimeter wave ranges. This increased path-loss limits potential communications range, however high frequency bands allow for smaller frequency reuse distances, larger bandwidth and small beam width allowing for higher gain values, which in turn can compensate to some extent for the experienced higher path-loss.

As of today, licensed spectrum is primarily used for wide area networks. The license costs are significant but on the other hand, the licensed spectrum permits high transmission power, accurate cell planning and full frequency re-use without the need to apply schemes like Listen-Before-Talk (LBT). This ensures good coverage even in areas of sparse deployments. The exclusive use of the spectrum minimizes the risk of delay spikes and maximizes the capacity.

On the other hand, Wi-Fi, LTE License Assisted Access (LAA) and other emerging technologies, use unlicensed spectrum. Such technologies permit access to wide frequency bands given that a wireless device must ensure fair access to the spectrum. In some bands this is typically achieved by coexistence mechanisms such as LBT, wherein an energy detection just before a planned transmission burst may reveal that the spectrum is already used by another wireless device. Various back-off schemes are supposed to keep access delay short while making the spectrum sharing fair. Moreover, well-established constraints on the radio requirements of the various wireless devices are set by the regulations. The main purpose for having such restrictions is the aim of establishing fair coexistence between the different technologies that are operating in these unlicensed bands. These restrictions are region- and frequency band-specific and highly depend on the specific band allocation to the various applications. Hence, these factors and restrictions pose several design challenges on the evolving RATs.

SUMMARY

An object of embodiments herein is to provide a mechanism to provide a wireless communications network in a resource efficient manner.

According to an aspect the object is achieved by providing a method performed by a wireless device for managing communication of the wireless device in a wireless communications network. The wireless device determines at least two waveform parameters based on a metric of the wireless device, for communicating data between the wireless device and a radio network node in the wireless communications network. The wireless device further transmits an indication indicating the at least two determined waveform parameters to the radio network node.

According to another aspect the object is achieved by providing a method performed by a radio network node for managing communication of a wireless device in a wireless communications network. The radio network node receives, from the wireless device, an indication indicating at least two waveform parameters for communicating data between the wireless device and the radio network node in the wireless communications network. The radio network node selects one or more waveform parameters taking the indication into account; and transmits a selection indication indicating the one or more selected waveform parameters to the wireless device.

According to yet another aspect the object is achieved by providing a wireless device for managing communication of the wireless device in a wireless communications network. The wireless device is configured to determine at least two waveform parameters based on a metric of the wireless device, for communicating data between the wireless device and a radio network node in the wireless communications network. The wireless device is further configured to transmit an indication indicating the at least two determined waveform parameters to the radio network node.

According to still another aspect the object is achieved by providing a radio network node for managing communication of a wireless device in a wireless communications network. The radio network node is configured to receive from the wireless device, an indication indicating at least two waveform parameters for communicating data between the wireless device and the radio network node in the wireless communications network. The radio network node is further configured to select one or more waveform parameters taking the indication into account; and to transmit a selection indication indicating the one or more selected waveform parameters to the wireless device.

It is furthermore provided herein a computer program comprising instructions, which, when executed on at least one processor, cause the at least one processor to carry out any of the methods above, as performed by the communication nodes. It is additionally provided herein a computer-readable storage medium, having stored thereon a computer program comprising instructions which, when executed on at least one processor, cause the at least one processor to carry out the method according to any of the methods above, as performed by the communication nodes.

According to embodiments herein the wireless device determines at least two waveform parameters such as numerologies, width of subcarrier spacing and/or lengths of cyclic prefix, and transmits the indication indicating these at least two waveform parameters to the radio network node. Thus, the radio network node selects one or more waveform parameters to actually use but takes the indication into account making the decision more wireless device adapted and may lead to e.g. an improved power consumption at the wireless device or throughput during communication of the wireless device. Therefore the performance of a wireless communication network is improved since the radio network node is allowed to take into account e.g. capability of the wireless device when selecting one or more waveform parameters for communication in the wireless communications network.

BRIEF DESCRIPTION OF THE DRAWINGS

Embodiments will now be described in more detail in relation to the enclosed drawings, in which:

FIG. 6 is a schematic block diagram depicting a radio network node according to embodiments herein.

DETAILED DESCRIPTION

Figure 1:
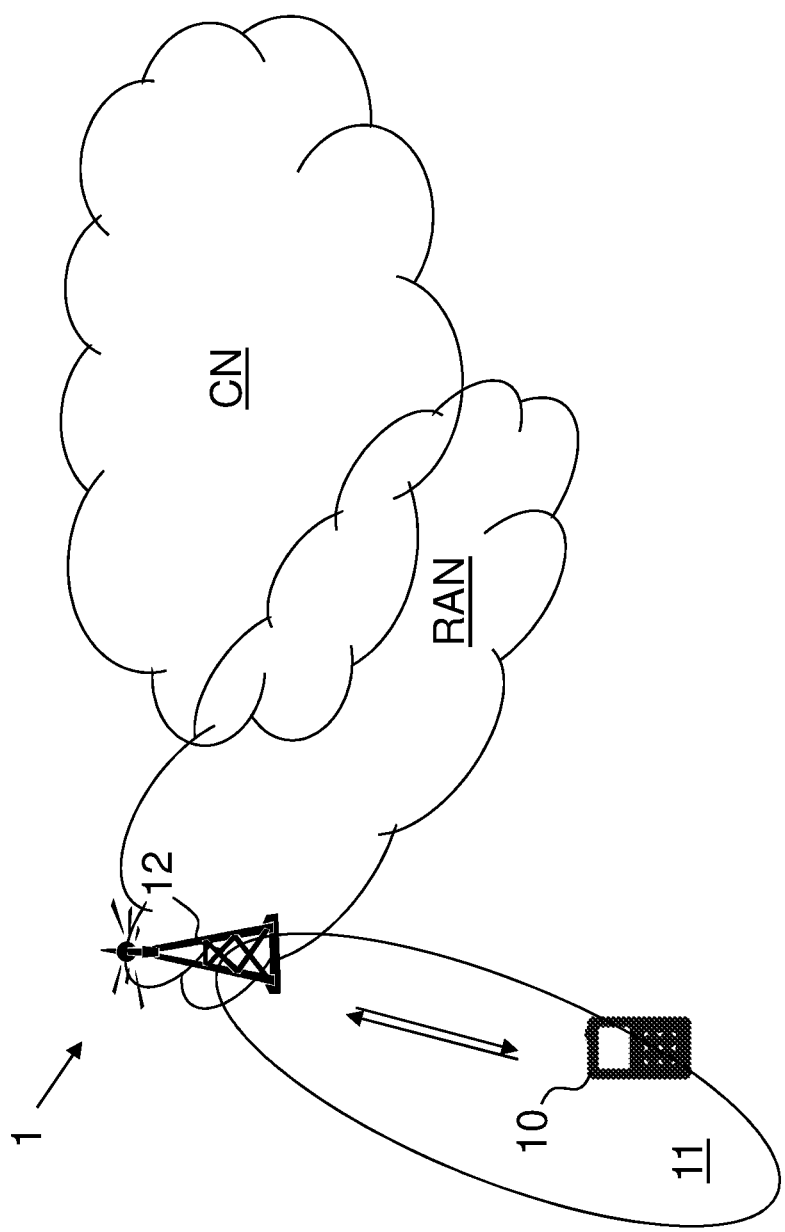
FIG. 1 is a schematic diagram depicting a wireless communications network according to embodiments herein.

Embodiments herein relate to wireless communications networks in general. FIG. 1 is a schematic overview depicting a wireless communications network 1. The wireless communications network 1 comprises one or more RANs and one or more CNs. The wireless communications network 1 may use one or a number of different technologies, such as Wi-Fi, Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communications networks such as e.g. WCDMA and LTE.

In the wireless communications network 1, a wireless device 10, such as a mobile station, a non-access point (non-AP) STA, a STA, a user equipment and/or a wireless terminals, machine type devices such as a sensor or an actuator, may communicate via one or more Access Networks (AN), e.g. a RAN, to one or more core networks (CN). It should be understood by the skilled in the art that "wireless device" is a non-limiting term which means any terminal, wireless communications terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 1 comprises a radio network node 12 providing radio coverage over a geographical area, which may be provided by one or more beams covering a service area 11, or cell, of a first radio access technology (RAT), such as NR, 5G, LTE, Wi-Fi or similar. The radio network node 12 may be a transmission and reception point (TRP) e.g. a radio-access network node such as a Wireless Local Area Network (WLAN) access point or Access Point Station (AP STA), an access controller, a base station e.g. a radio base station such as a NodeB, an evolved Node B (eNB, eNode B), gNodeB, a base transceiver station, a radio remote unit, an Access Point Base Station, a base station router, a transmission arrangement of a radio base station, a relay, a stand-alone access point or any other network unit capable of communicating with a wireless device within the service area served by the radio network node depending e.g. on the radio access technology and terminology used. The radio network node 12 may be referred to as a serving radio network node and communicates with the wireless device 10 with Downlink (DL) transmissions to the wireless device 10 and Uplink (UL) transmissions from the wireless device 10.

In prior art few capabilities of a wireless device are defined with regard to the waveform, e.g. in LTE there is only 15 kHz for the shared data channel. The wireless device is not involved in setting e.g. numerology of Orthogonal Frequency-Division Multiplexing (OFDM) but must obey the fixed standard or commands of the radio network node. These settings may lead to disadvantages with regard to metrics of the wireless device such as power consumption at the wireless device or performance e.g. throughput during communication with the wireless device.

According to embodiments herein the wireless device 10 determines at least two waveform parameters for communicating with the radio network node 12. These at least two waveform parameters are reported up to the radio network node 12, i.e. the wireless device transmits to the radio network node 12, an indication, e.g. a list, indicating the at least two waveform parameters. For example, the wireless device may transmit to the radio network node 12 two or more choices or values of a single waveform parameter or two or more different waveform parameters. The radio network node 12 then performs a selection of one or more waveform parameters taking the reported at least two waveform parameters into account. Since the radio network node 12 is allowed to take into account e.g. suggestions and thereby a preference or a capability of the wireless device 10 when selecting the one or more waveform parameters for communication in the wireless communications network 1 the performance of a wireless communications network may be improved.

It should be noted that the waveform parameters may be referred to as network regulated parameters, configuration parameters, or network scheduling parameters and may comprise one or more of: a frequency band, a numerology such as a width of a subcarrier spacing or length of a cyclic prefix, a maximum bandwidth, and a Modulation and Coding Scheme (MCS).

Figure 2:
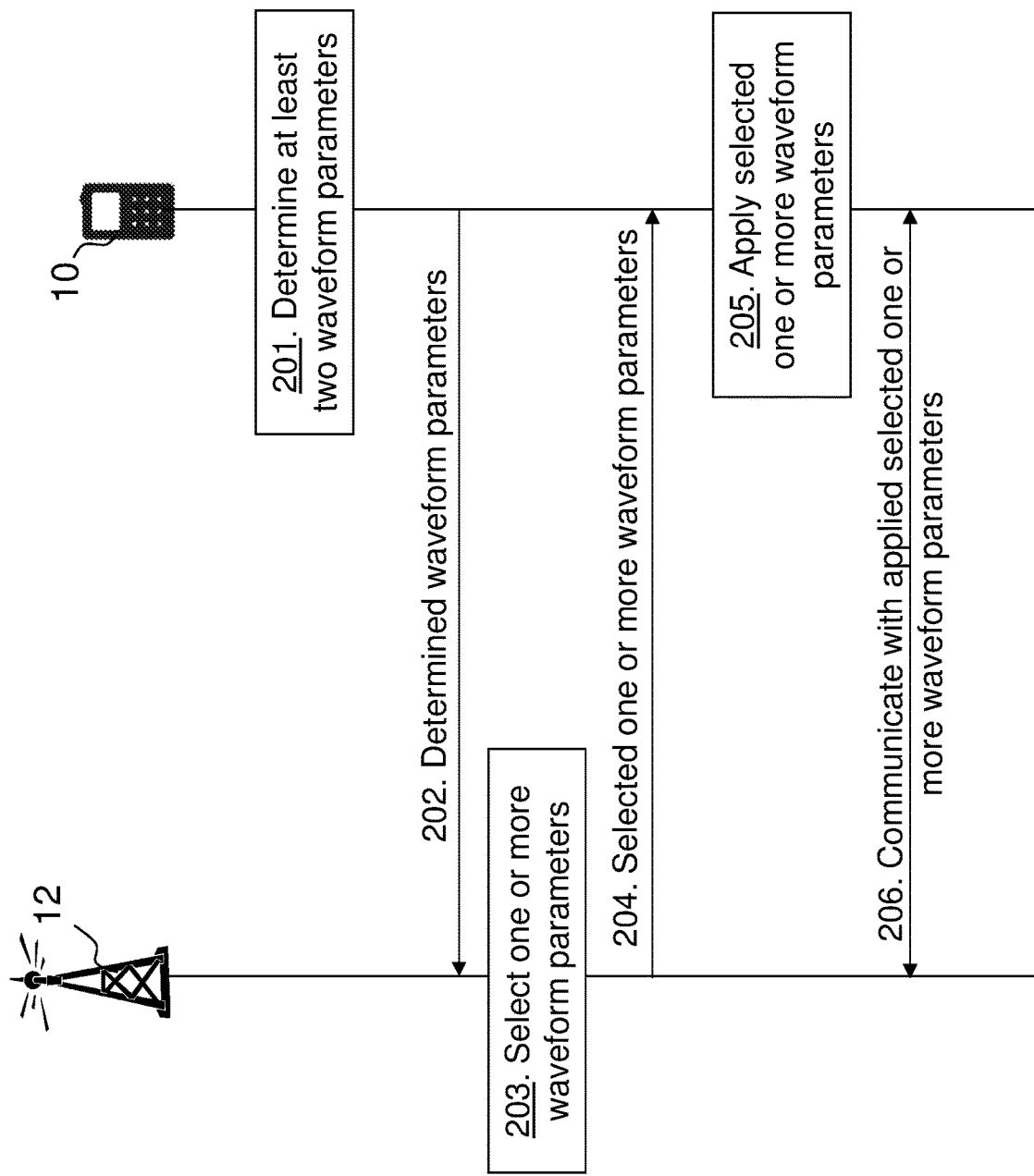
FIG. 2 is a combined flowchart and signalling scheme according to embodiments herein.

FIG. 2 is a combined flowchart and signaling scheme according to embodiments herein.

Action 201. The wireless device 10 determines at least two waveform parameters based on a metric, such as power consumption, of the wireless device 10, for communicating data between the wireless device 10 and the radio network node 12 in the wireless communications network 1. The wireless device 10 may e.g. determine one or more sets of waveform parameters e.g. subcarrier spacing and MCS, which use e.g. filters, Fast Fourier Transforms (FFT), Local Oscillator, sampling rates, and/or Power amplifier settings with a low power consumption. The wireless device 10 may determine two or more choices or values of a single waveform parameter or two or more different waveform parameters. These at least two waveform parameters may be determined to e.g. minimize battery consumption at the wireless device 10, improve throughput of communicating data to and from the wireless device 10, or similar.

Action 202. The wireless device 10 transmits the indication indicating the at least two determined waveform parameters to the radio network node 12. The waveform parameters or the sets of waveform parameters may be structured in an ordered list indicating a priority order of the at least two determined waveform parameters. For example, a first MCS or MCS range and a first subcarrier spacing leading to a first power consumption are placed first in the list e.g. associated with a first index and a second MCS or MCS range (may be the same as the first MCS) and a second subcarrier spacing leading to a second power consumption are placed second in the list e.g. associated with a second index. Thus, embodiments may be using a single parameter including multiple waveform parameters, e.g. parameter index 1 include the first MCS and the first subcarrier spacing and parameter index 2 include the second MCS and the second subcarrier spacing. The at least two determined waveform parameters may also be different values of the same waveform parameter e.g. two choices for the subcarrier spacing. The indication may e.g. be a list, e.g. a single list defining different subcarrier spacing such as index #1: $\Delta f=15$ kHz, index #2: $2\Delta f=30$ kHz. Alternatively, the list may be a more complex list such as index #1: $\Delta f=15$ kHz, MCS={Quadrature Phase-Shift Keying (QPSK), 16 Quadrature amplitude modulation (QAM), 64 QAM}; index #2: $\Delta f=30$ kHz, MCS={QPSK, 16 QAM, 64 QAM, 256 QAM}). A wider subcarrier spacing is more robust towards phase noise which allows higher order modulation and coding, such as 256 QAM which is only present in index #2 in the more complex list.

Action 203. The radio network node 12 receives the indication and selects one or more waveform parameters taking the indication into account. For example, the radio network node 12 may select the one or more waveform parameters, e.g. MCS and subcarrier spacing, based on a capability or configuration or deployment of the radio network node 12 but also taking the indication into account such as checking first MCS and first subcarrier spacing and second subcarrier spacing and second MCS in the list. For example, the wireless device 10 may indicate that a subcarrier spacing of 30 kHz is preferred before 15 kHz since 30 kHz is more robust towards phase noise. At the radio network node 12 it is determined that 30 kHz is OK for small and medium cell sizes but not OK for very large cells.

Action 204. The radio network node 12 then informs the wireless device 10 of the one or more selected waveform parameters. Thus, the radio network node 12 transmits a selection indication to the wireless device 10 indicating the one or more selected waveform parameters.

Action 205. The wireless device 10 may then apply the one or more selected waveform parameters, indicated in the selection indication, for or when communicating with the radio network node 12. For example the wireless device 10 may adjust filters, FFTs, FFT window lengths, Local Oscillator settings, sampling rates, and/or Power amplifier settings according to the one or more selected waveform parameters.

Action 206. The wireless device may then perform communication with applied selected one or more waveform parameters e.g. communicate using the adjusted settings or circuitries.

As stated above the at least two waveform parameters may comprise one or more of: a frequency band, a numerology such as a width of a subcarrier spacing or length of a cyclic prefix, a maximum bandwidth, and a MCS.

Frequency Bands and Numerologies

Due to the very large operating range of e.g. New Radio (NR) a single numerology may not be adopted into the wireless communications network. NR will adopt a range of different numerologies, e.g. OFDM subcarrier spacings and cyclic prefix (CP) lengths, likely in the form of $\Delta f_n = 2^n 15$ kHz, with n being an integer and $\Delta f$ being a subcarrier spacing. Narrow subcarriers correspond to long OFDM symbol duration $T_{OFDM,n} = 1/\Delta_{f,n}$ and a small, compared to the symbol length, cyclic prefix that has less overhead but still provides robustness towards multi-path propagation in large cells. Wide subcarrier spacing on the other hand are robust towards Doppler and phase noise, both effects increase with carrier frequency. From a carrier frequency perspective, low subcarrier spacing's are typically used at low carrier frequencies while large subcarrier spacing's are used at high carrier frequencies. There are of course no hard boundaries between two numerologies, performance degrades smooth relative to the optimum numerology. In addition to carrier frequency also delay can play a role, wider subcarrier spacing's lead to shorter OFDM symbols and thus to reduced subframes and transmission time intervals (TTI).

Example values for n={−2,0,1,2,3,5} are corresponding to $\Delta f$={3.75, 15, 30, 60, 120, 480} kHz with the lower subcarriers spacing typically preferred for lower carrier frequencies and the higher subcarrier spacing's preferred for the higher carrier frequencies. Lengths of CP and subcarrier spacing may be selected together. The wireless device 10 may suggest (transmit) the list e.g. {$\Delta f$=60 kHz, $\Delta f$=30 kHz, $\Delta f$=15 kHz}. Wider subcarrier spacing would allow a local oscillator at the wireless device 10 to operate with higher phase noise and less power consumption. Therefore, the wireless device 10 may prefer wider subcarrier spacing and send an ordered list preferring wider subcarrier spacing to the radio network node 12. However, wider subcarrier spacings have smaller CP which can lead to reduced or limited performance in large delay spread environments such a large service areas. The wireless device 10 is not aware of small/large service areas (small/large delay spread) but the radio network node 12 may know and depending on which numerology is acceptable from a delay spread point of view, the radio network node 12 may e.g. allow a sub carrier spacing of 60 kHz or some more narrow numerology.

Circuitry of the Wireless Device and Radio Requirements

A wireless device typically has a maximum FFT size, e.g. 2048 or 4096. The FFT size together with the subcarrier spacing $\Delta f_n$ determines the maximum transmission bandwidth per carrier of the wireless device. Note that in NR the maximum transmission bandwidth of a wireless device can be less than the system bandwidth. Larger FFTs typically require higher memory and power consumption.

Wider subcarrier spacing's are more robust towards phase noise than lower subcarrier spacing. Generation of a local oscillator waveform with low phase noise leads to higher power consumption compared to signal generation with higher phase noise. Hence the wireless device 10 may determine a wider subcarrier spacing leading to a reduced power consumption.

Maximum signal bandwidth determines Analog-to-Digital Conversion (ADC) bandwidth and Digital-to-Analog Conversion (DAC) bandwidth. Wider ADC and DAC bandwidth lead to higher power consumption. Hence, the wireless device 10 may determine and suggest a maximum system bandwidth that gives a lower ADC and DAC bandwidth compared to a current maximum system bandwidth and that leads to a lower power consumption at the wireless device 10.

Transmissions must typically fulfill certain requirements on its emissions outside an active bandwidth, such as in-band-Signal to Noise Ratio (SNR), Adjacent Channel Leakage power Ratio (ACLR), out-of-band emissions, etc. The transmission spectrum of wider subcarrier spacings decays slower than the spectrum of narrow subcarrier spacings, thus longer filters are needed to achieve the same spectrum roll off. Longer filters—depending on implementation—may require much higher power consumption at the wireless device 10. Hence the wireless device 10 may determine a subcarrier spacing leading to a shorter filter.

A lower order modulation of a modulation and coding scheme (MCS) can sustain higher Error Vector Magnitude (EVM). A power amplifier (PA) may operate with lower supply voltage and thus power consumption if the input signal can sustain higher EVM since the signal can be clipped harder, which results in higher EVM but also enables lower PA supply voltages. Also other components such as local oscillator can operate with lower power if larger EVM values are permitted. At the same time reduces the max data rate if lower order modulations are used requiring longer on-time for a given data amount, increasing power consumption. Thus the PA setting and its impact on power consumption is a trade-off between lower PA power consumption and longer on-times. Thus, the wireless device 10 may determine and suggest an MCS taking both sustainability to higher EVM and maximum data rate into account to obtain e.g. a low power consumption.

Figure 3:
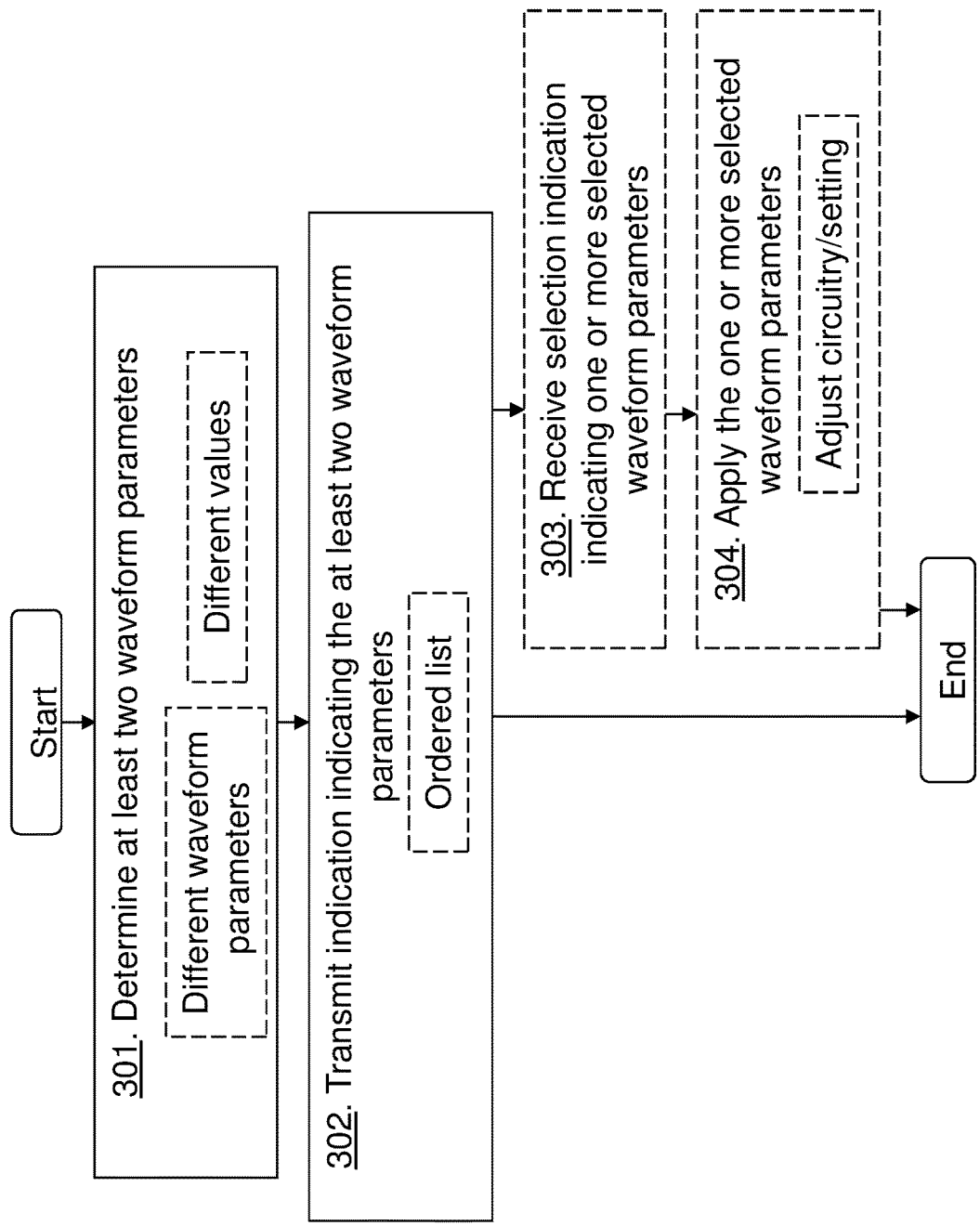
FIG. 3 is a flowchart depicting a method performed by a wireless device according to embodiments herein.

FIG. 3 is a flowchart depicting a method performed by the wireless device 10 for managing communication of the wireless device 10 in the wireless communications network 1.

Action 301. The wireless device 10 determines at least two waveform parameters based on the metric of the wireless device 10, for communicating data between the wireless device 10 and the radio network node 12 in the wireless communications network 1. The at least two waveform parameters may comprise one or more of: a frequency band; a numerology such as subcarrier spacing width and CP length; a maximum bandwidth; an antenna configuration;

and a Modulation and Coding Scheme. The at least two waveform parameters are different waveform parameters or different values of a same waveform parameter. The metric of the wireless device 10 may comprise one or more of: power consumption of the wireless device or performance of the wireless device Thus, the wireless device 10 may determine two or more waveform parameters that consume power as little as possible but also provide a level of throughput of data over a certain rate.

Action 302. The wireless device 10 transmits to the radio network node 12 the indication, e.g. the list, indicating the at least two determined waveform parameters. The indication may be an ordered list indicating a priority order of the at least two determined waveform parameters.

Action 303. The wireless device 10 may receive the selection indication indicating one or more selected waveform parameters from the radio network node 12.

Action 304. The wireless device 10 may then apply the one or more selected waveform parameters when communicating with the radio network node 12. For example, the wireless device 10 may adjust a setting or circuitry at the wireless device 10 associated with the one or more selected waveform parameters.

Figure 4:
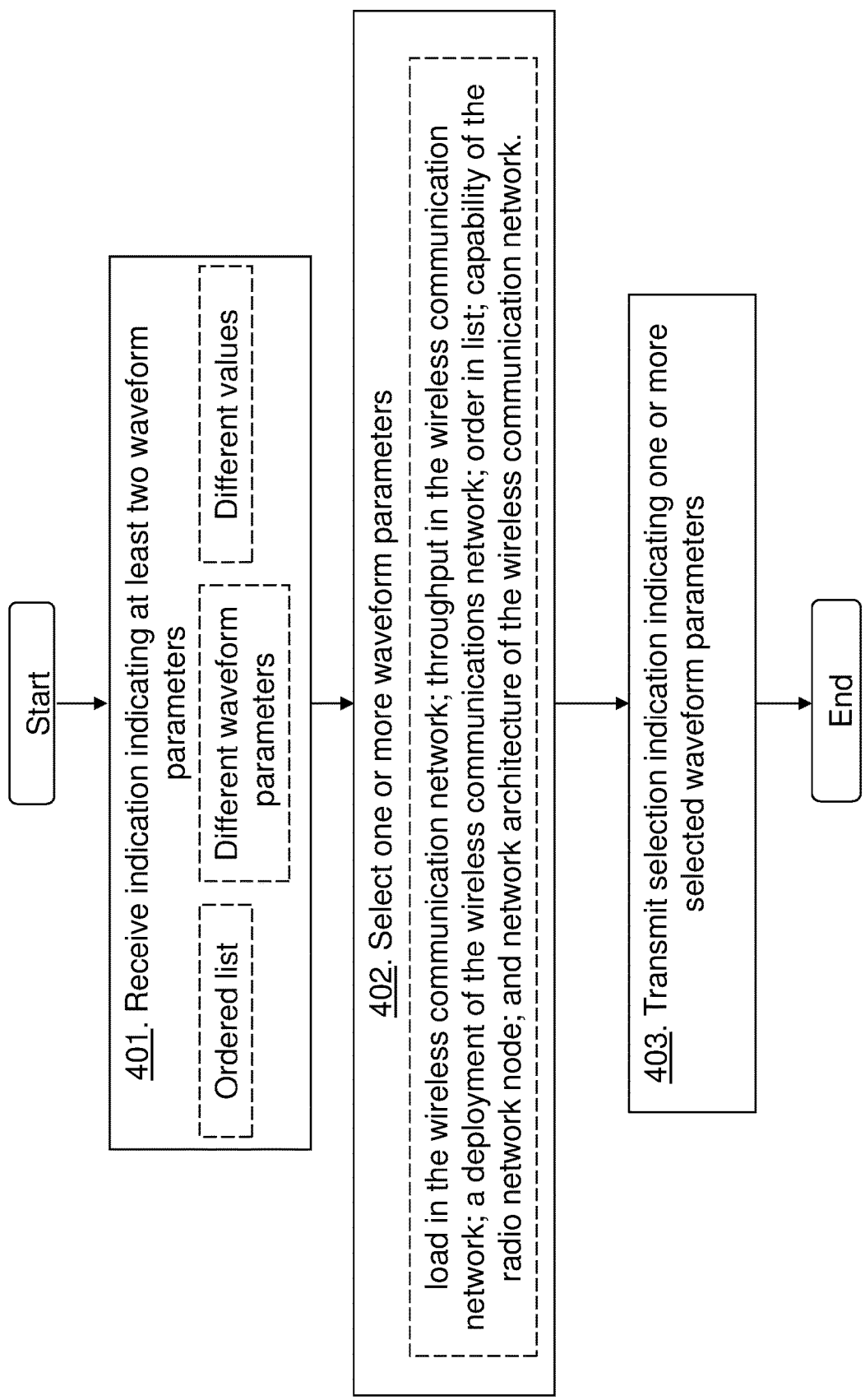
FIG. 4 is a flowchart depicting a method performed by a radio network node according to embodiments herein.

FIG. 4 is a flowchart depicting a method performed by the radio network node 12 for managing communication of the wireless device 10 in the wireless communications network.

Action 401. The radio network node 12 receives from the wireless device 10, the indication. The indication, e.g. index or a list, indicates the at least two waveform parameters for communicating data between the wireless device 10 and the radio network node 12 in the wireless communications network 1. The wireless device may e.g. transmit one index per list such as a single list. The single list may comprise settings for one or two waveform parameters. The waveform parameters may be independent waveform parameters and the wireless device 10 may send two lists a first list indicating a first determined waveform parameter {paraA=Val_A1, paraA=Val_A2} and a second list indicating a second determined waveform parameter {paraB=Val_B1, paraB=Val_B2, paraB=Val_B3}. The indication may be the ordered list indicating a priority order of the at least two waveform parameters in the list. The priority order being an indication from the wireless device 10 of a preferred alternative for the wireless device 10. The at least two waveform parameters may be different waveform parameters e.g. MCS and subcarrier spacing or different values of a same waveform parameter e.g. a first subcarrier spacing and a second subcarrier spacing.

Action 402. The radio network node 12 selects one or more waveform parameters taking the indication into account. The radio network node 12 may select the one or more waveform parameters based on one or more of: a load in the wireless communications network; a throughput in the wireless communications network; a deployment of the wireless communications network 1; an order in the list being the indication; a capability of the radio network node; and a network architecture of the wireless communications network. E.g. the radio network node 12 may select the waveform parameter such as subcarrier spacing based on the received indication from the wireless device and also on size of service area. The one or more waveform parameters may comprise one or more of: a frequency band; a numerology; a maximum bandwidth; an antenna configuration; and a MCS.

Action 403. Furthermore, the radio network node 12 transmits the selection indication indicating the one or more selected waveform parameters to the wireless device 10. The radio network node 12 may e.g. respond with indices, one for the first list and one for the second list.

Figure 5:
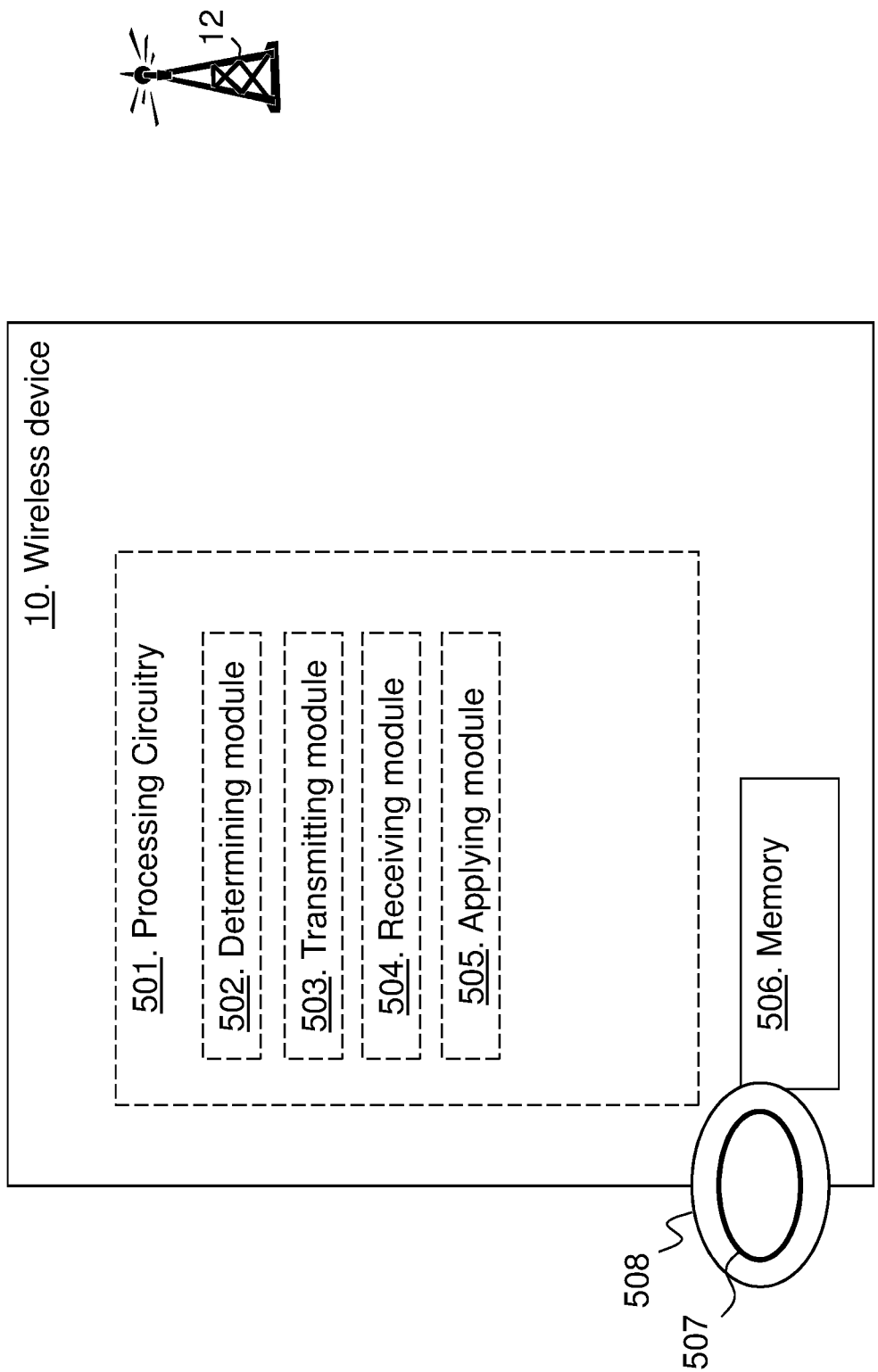
FIG. 5 is a schematic block diagram depicting a wireless device according to embodiments herein.

FIG. 5 is a schematic block diagram depicting the wireless device 10 for managing communication of the wireless device 10 in the wireless communications network.

The wireless device 10 may comprise a processing circuitry 501, e.g. one or more processors, configured to perform the methods herein.

The wireless device 10 may comprise a determining module 502. The wireless device 10, the processing circuitry 501, and/or the determining module 502 is configured to determine the at least two waveform parameters based on the metric of the wireless device 10, for communicating data between the wireless device 10 and the radio network node 12 in the wireless communications network 1. The at least two waveform parameters may be different waveform parameters or different values of the same waveform parameter. The at least two waveform parameters may comprise one or more of: a frequency band; a numerology; a maximum bandwidth; an antenna configuration; and a Modulation and Coding Scheme. The metric of the wireless device 10 may comprise one or more of: the power consumption of the wireless device 10 or the performance of the wireless device 10.

The wireless device 10 may comprise a transmitting module 503, e.g. a transmitter or a transceiver. The wireless device 10, the processing circuitry 501, and/or the transmitting module 503 is configured to transmit the indication indicating the at least two determined waveform parameters to the radio network node 12.

The indication may be the ordered list indicating the priority order of the at least two determined waveform parameters.

The wireless device 10 may comprise a receiving module 504, e.g. a receiver or a transceiver. The wireless device 10, the processing circuitry 501, and/or the receiving module 504 may be configured to receive the selection indication indicating the one or more selected waveform parameters from the radio network node 12.

The wireless device 10 may comprise an applying module 505. The wireless device 10, the processing circuitry 501, and/or the applying module 505 may be configured to apply the one or more selected waveform parameters when communicating with the radio network node 12. The wireless device 10, the processing circuitry 501, and/or the applying module 505 may e.g. be configured to apply the one or more selected waveform parameters by being configured to adjust the setting or circuitry at the wireless device 10 associated with the one or more selected waveform parameters.

The wireless device 10 further comprises a memory 506 comprising one or more memory units. The memory 506 comprises instructions executable by the processing circuitry 501 to perform the methods herein when being executed in the wireless device 10. The memory 506 is arranged to be used to store e.g. information, data such as configurations, waveform parameters, metric values, setting circuitry and application(s) to perform the methods described herein when being executed on e.g. a processor, etc.

The methods according to the embodiments described herein for the wireless device 10 are respectively implemented by means of e.g. a computer program 507 or a computer program product, comprising instructions, i.e., software code portions, which, when executed on at least one processor, cause the at least one processor to carry out the actions described herein, as performed by the wireless device 10. The computer program 507 may be stored on a computer-readable storage medium 508, e.g. a disc or similar. The computer-readable storage medium 507, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

FIG. 6 is a schematic block diagram depicting the radio network node 12 for managing communication of the wireless device in the wireless communications network.

The radio network node 12 may comprise a processing circuitry 601, e.g. one or more processors, configured to perform the methods herein.

The radio network node 12 may comprise a receiving module 602, e.g. a receiver or a transceiver. The radio network node 12, the processing circuitry 601, and/or the receiving module 602 is configured to receive from the wireless device 10, the indication indicating the at least two waveform parameters for communicating data between the wireless device 10 and the radio network node 12 in the wireless communications network 1. The indication may be the ordered list indicating the priority order of the at least two waveform parameters. The at least two waveform parameters may be different waveform parameters or different values of the same waveform parameter.

The radio network node 12 may comprise a selecting module 603, e.g. a receiver or a transceiver. The radio network node 12, the processing circuitry 601, and/or the selecting module 603 is configured to select the one or more waveform parameters taking the indication into account. The radio network node 12, the processing circuitry 601, and/or the selecting module 603 may be configured to select the one or more waveform parameters based on one or more of: the load in the wireless communications network; the throughput in the wireless communications network; the deployment of the wireless communications network; the order in the list being the indication; the capability of the radio network node; and the network architecture of the wireless communications network. The one or more waveform parameters, selected by the radio network node 12, may comprise one or more of: a frequency band; a numerology; a maximum bandwidth; an antenna configuration; and a Modulation and Coding Scheme.

The radio network node 12 may comprise a transmitting module 604, e.g. a transmitter or a transceiver. The radio network node 12, the processing circuitry 601, and/or the transmitting module 604 is configured to transmit the selection indication indicating the one or more selected waveform parameters to the wireless device 10.

The radio network node 12 further comprises a memory 605 comprising one or more memory units. The memory 605 comprises instructions executable by the processing circuitry 601 to perform the methods herein when being executed in the radio network node 12. The memory 605 is arranged to be used to store e.g. information, data such as configurations, waveform parameters, the load in the wireless communications network; the throughput in the wireless communications network; the deployment of the wireless communications network; the order in the list being the indication; the capability of the radio network node; and the network architecture of the wireless communications network and application(s) to perform the methods described herein when being executed on e.g. a processor, etc.

The methods according to the embodiments described herein for the radio network node 12 are respectively implemented by means of e.g. a computer program 606 or a computer program product, comprising instructions, i.e., software code portions, which, when executed on at least one processor, cause the at least one processor to carry out the actions described herein, as performed by the radio network node 12. The computer program 606 may be stored on a computer-readable storage medium 607, e.g. a disc or similar. The computer-readable storage medium 606, having stored thereon the computer program, may comprise the instructions which, when executed on at least one processor, cause the at least one processor to carry out the actions described herein, as performed by the radio network node 12. In some embodiments, the computer-readable storage medium may be a non-transitory computer-readable storage medium.

As will be readily understood by those familiar with communications design, means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless devices or radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method of operation by a wireless device operating in a wireless communications network, the method comprising:
   determining a preferred subcarrier spacing to use for communicating data between the wireless device and a radio network node of the wireless communications network via an Orthogonal Frequency Division Multiplexing (OFDM) carrier, the determining made by the wireless device in dependence on communication performance or power consumption criteria, wherein determining the preferred subcarrier spacing comprises determining two or more preferred combinations of subcarrier spacing and Modulation and Coding Scheme (MCS) to use for communicating the data between the wireless device and the radio network node; and
   indicating the preferred subcarrier spacing to the radio network node, wherein indicating the preferred subcarrier spacing comprises indicating the two or more preferred combinations of subcarrier spacing and MCS and further indicating an order of preference for the two or more preferred combinations.

2. The method of claim 1, further comprising:
receiving an indication from the radio network node, indicating a selected subcarrier spacing, as selected by the radio network node in consideration of the preferred subcarrier spacing; and
using the selected subcarrier spacing for communicating the data between the wireless device and the radio network node.

3. The method of claim 2, wherein using the selected subcarrier spacing for communicating the data between the wireless device and the radio network node comprises operating transceiver circuitry of the wireless device according to the selected subcarrier spacing, for transmission or reception of data.

4. The method of claim 1, wherein determining the preferred subcarrier spacing comprises determining two or more subcarrier spacings and a corresponding order of preference for the two or more subcarrier spacings, and wherein indicating the preferred subcarrier spacing comprises indicating the two or more subcarrier spacings and the corresponding order of preference.

5. The method of claim 1, wherein determining the preferred subcarrier spacing comprises determining a preferred combination of subcarrier spacing and Modulation and Coding Scheme (MCS) to use for communicating the data between the wireless device and the radio network node, and wherein indicating the preferred subcarrier spacing comprises indicating the preferred combination of subcarrier spacing and MCS.

6. The method of claim 1, wherein determining the preferred subcarrier spacing comprises determining a preferred frequency band for communicating the data between the wireless device and the radio network node, in addition to determining the preferred subcarrier spacing, and wherein indicating the preferred subcarrier spacing comprises indicating the preferred frequency band to the radio network node, along with indicating the preferred subcarrier spacing.

7. The method of claim 1, wherein different subcarrier spacings, among a plurality of defined subcarrier spacings, are associated with different levels of power consumption at the wireless device or different levels of data throughput, and wherein determining the preferred subcarrier spacing comprises selecting one of the defined subcarrier spacings in dependence on a targeted level of power consumption or data throughput.

8. A method of operation by a radio network node of a wireless communications network, the method comprising:
receiving an indication from a wireless device of a preferred subcarrier spacing to use for communicating data between the radio network node and the wireless device via an Orthogonal Frequency Division Multiplexing (OFDM) carrier, as determined by the wireless device in dependence on a communication performance or power consumption criteria at the wireless device, wherein the preferred subcarrier spacing is determined by determining two or more preferred combinations of subcarrier spacing and Modulation and Coding Scheme (MCS) to use for communicating the data between the wireless device and the radio network node;
selecting a subcarrier spacing in consideration of the preferred subcarrier spacing and a radio configuration or operating condition of the radio network node; and
sending an indication to the wireless device, indicating the selected subcarrier spacing for use in communicating the data between the radio network node and the wireless device.

9. The method of claim 8, further comprising using the selected subcarrier spacing for communicating the data between the radio network node and the wireless device, by configuring transceiver circuitry of the radio network node to operate according to the selected subcarrier spacing.

10. The method of claim 8, wherein the radio configuration considered by the radio network node is a carrier frequency used for communicating the data, wherein the radio network node is configured to accommodate the preferred subcarrier spacing or not, in dependence on the carrier frequency.

11. The method of claim 8, wherein the radio configuration considered by the radio network node is the size of a service area in which the wireless device operates with respect to the radio network node, wherein the radio network node is configured to accommodate the preferred subcarrier spacing or not, in dependence on the size of the service area.

12. The method of claim 8, wherein the operating condition considered by the radio network node is a load on the wireless communications network, at least with respect to a service area of the wireless communications network in which the wireless device operates, wherein the radio network node is configured to accommodate the preferred subcarrier spacing or not, in dependence on the load.

13. The method of claim 8, wherein the preferred subcarrier spacing comprises two or more subcarrier spacings and a corresponding order of preference for the two or more subcarrier spacings, and wherein selecting the subcarrier spacing in consideration of the preferred subcarrier spacing and the radio capability or configuration of the radio network node comprises: selecting a most-preferred one among the two or more subcarrier spacings that is permitted by the radio network in view of the radio configuration or operating condition.

14. A wireless device configured for operation in a wireless communications network, the wireless device comprising:
transceiver circuitry configured for wirelessly communicating with a radio network node of the wireless communications network; and
processing circuitry operatively associated with the transceiver circuitry and configured to:
determine a preferred subcarrier spacing to use for communicating data between the wireless device and a radio network node of the wireless communications network via an Orthogonal Frequency Division Multiplexing (OFDM) carrier, the determining made by the wireless device in dependence on communication performance or power consumption criteria, wherein determining the preferred subcarrier spacing comprises determining two or more preferred combinations of subcarrier spacing and Modulation and Coding Scheme (MCS) to use for communicating the data between the wireless device and the radio network node; and
indicate the preferred subcarrier spacing to the radio network node, via the communication circuitry, wherein indicating the preferred subcarrier spacing comprises indicating the two or more preferred combinations of subcarrier spacing and MCS and further indicating an order of preference for the two or more preferred combinations.

15. The wireless device of claim 14, wherein the processing circuitry is further configured to:
- receive an indication from the radio network node, indicating a selected subcarrier spacing, as selected by the radio network node in consideration of the preferred subcarrier spacing; and
- use the selected subcarrier spacing for communicating the data between the wireless device and the radio network node.

16. The wireless device of claim 14, wherein the processing circuitry is configured to determine the preferred subcarrier spacing by determining two or more subcarrier spacings and a corresponding order of preference for the two or more subcarrier spacings, and to indicate the preferred subcarrier spacing by indicating the two or more subcarrier spacings and the corresponding order of preference.

17. The wireless device of claim 14, wherein different subcarrier spacings, among a plurality of defined subcarrier spacings, are associated with different levels of power consumption at the wireless device or different levels of data throughput, and wherein the processing circuitry is configured to determine the preferred subcarrier spacing by selecting one of the defined subcarrier spacings in dependence on a targeted level of power consumption or data throughput.

18. A radio network node configured for operation in a wireless communications network, the radio network node comprising:
- transceiver circuitry for communicating with a wireless communication device; and
- communication circuitry operatively associated with the transceiver circuitry and configured to:
  - receive an indication from a wireless device of a preferred subcarrier spacing to use for communicating data between the radio network node and the wireless device via an Orthogonal Frequency Division Multiplexing (OFDM) carrier, as determined by the wireless device in dependence on a communication performance or power consumption criteria at the wireless device, wherein the preferred subcarrier spacing is determined by determining two or more preferred combinations of subcarrier spacing and Modulation and Coding Scheme (MCS) to use for communicating the data between the wireless device and the radio network node;
  - select a subcarrier spacing in consideration of the preferred subcarrier spacing and a radio configuration or operating condition of the radio network node; and
  - send an indication to the wireless device, indicating the selected subcarrier spacing for use in communicating the data between the radio network node and the wireless device.

19. The radio network node of claim 18, wherein the processing circuitry is further configured to use the selected subcarrier spacing for communicating the data between the radio network node and the wireless device, based on configuring the transceiver circuitry to operate with the selected subcarrier spacing.

20. The radio network node of claim 18, wherein the radio configuration is at least one of:
- a carrier frequency used for communicating the data, and wherein the processing circuitry is configured to accommodate the preferred subcarrier spacing or not, in dependence on the carrier frequency;
- the size of a service area in which the wireless device operates with respect to the radio network node, wherein the processing circuitry is configured to accommodate the preferred subcarrier spacing or not, in dependence on the size of the service area; or
- a load on the wireless communications network, at least with respect to a service area of the wireless communications network in which the wireless device operates, wherein the processing circuitry is configured to accommodate the preferred subcarrier spacing or not, in dependence on the load.

21. The radio network node of claim 18, wherein the preferred subcarrier spacing comprises two or more subcarrier spacings and a corresponding order of preference for the two or more subcarrier spacings, and wherein the processing circuitry is configured to select the subcarrier spacing in consideration of the preferred subcarrier spacing and the radio capability or configuration of the radio network node by: selecting a most-preferred one among the two or more subcarrier spacings that is permitted by the radio network in view of the radio configuration or operating condition.

* * * * *